US006599339B2

(12) United States Patent
Oh

(10) Patent No.: US 6,599,339 B2
(45) Date of Patent: Jul. 29, 2003

(54) GRILL ASSEMBLY OF A CYCLONE DUST COLLECTING APPARATUS FOR A VACUUM CLEANER

(75) Inventor: Jang-keun Oh, Gwangju (KR)

(73) Assignee: Samsung Gwangju Electronics Co., Ltd., Gwangju (KR)

( * ) Notice: Subject to any disclaimer, the term of this patent is extended or adjusted under 35 U.S.C. 154(b) by 0 days.

(21) Appl. No.: 10/080,907

(22) Filed: Feb. 22, 2002

(65) Prior Publication Data

US 2002/0178699 A1 Dec. 5, 2002

(30) Foreign Application Priority Data

Jun. 1, 2001 (KR) ........................................ 2001-30831

(51) Int. Cl.[7] ................................................ B01D 45/12
(52) U.S. Cl. ...................... 55/413; 55/459.1; 55/DIG. 3
(58) Field of Search ....................... 55/424, 426, 459.1, 55/413, DIG. 3; 15/350, 353

(56) References Cited

U.S. PATENT DOCUMENTS 964,428 A * 7/1910 Johnson et al. ............... 55/415
2,071,975 A * 2/1937 Holm-Hansen et al. ....... 55/413

FOREIGN PATENT DOCUMENTS

| | | |
|---|---|---|
| JP | 1290724 | 10/1999 |
| SU | 1011272 | 4/1983 |
| SU | 1524931 | 11/1989 |

* cited by examiner

*Primary Examiner*—Robert Hopkins
(74) *Attorney, Agent, or Firm*—Ladas & Parry

(57) ABSTRACT

A grill assembly of a cyclone dust collecting apparatus for a vacuum cleaner capable of improving the capability of dust collecting of the vacuum cleaner by reducing the amount of the filth drawn into a vacuum-generating device through a grill. The grill assembly of a cyclone dust collecting apparatus for a vacuum cleaner is disposed at an upper part of an air discharging passage of a cyclone body that generates whirling air current from the air drawn thereinto and separates filth from the drawn air by a centrifugal force of the whirling air current. The grill assembly for preventing the filth from being drawn into a vacuum-generating device of the vacuum cleaner comprises a grill body, and a plurality of blades formed at a predetermined space for forming a passage along an outer circumference of the grill body. The passage is at an acute angle with a stream-line of the whirling air current, and each blade includes a protrusion member protruding from the outer circumference of the grill body to the outer part.

4 Claims, 5 Drawing Sheets

GRILL ASSEMBLY OF A CYCLONE DUST COLLECTING APPARATUS FOR A VACUUM CLEANER

BACKGROUND OF THE INVENTION

1. Field of the Invention

The present invention relates to a cyclone dust collecting apparatus for a vacuum cleaner, and more particularly to a grill assembly of a cyclone dust collecting apparatus for a vacuum cleaner capable of preventing backflow of the filth like hair to a vacuum-generating device.

2. Description of the Related Art

FIG. 1 shows one example of a conventional cyclone dust collecting apparatus for a vacuum cleaner. According to FIG. 1, the conventional cyclone dust collecting apparatus 10 for a vacuum cleaner comprises a cyclone body 20, a filth-collecting portion 30, and a partition 40.

An air suction passage 21, connected with a brush assembly (not shown) of the vacuum cleaner, is disposed at an upper part of the cyclone body 20. The air, which is drawn through the air suction passage 21, forms a whirling air current as it is drawn to the tangential direction of the cyclone body 20.

An air discharging passage 22, connected with a vacuum-generating device (not shown) of a vacuum cleaner, is disposed at an upper center of the cyclone body 20. A grill 23 is disposed at an inlet of the air discharging passage 22 for preventing filth such as hair being drawn to the vacuum-generating device.

As shown in FIG. 2, a plurality of passages 24 are formed at the grill 23 so that the cleaned air can be drawn therethrough. The undesignated reference character 'A' is a streamline of the whirling air current of the cyclone body 20.

For the conventional cyclone dust collecting apparatus 10 for a vacuum cleaner with the construction above, when the vacuum-generating device of the vacuum cleaner is operated, the air containing various filth on the cleaning surface is drawn to the cyclone body 20 through the air suction passage 21 and the brush assembly. The air drawn into the cyclone body 20 forms the whirling air current and is collected in the filth collecting portion 30 by being separated by a centrifugal force of the whirling air current, and the cleaned air flows to the vacuum-generating device through the passage 24 of the grill 23 and the air discharging passage 22.

On the other hand, some filth, which has not been separated from the air current, passes through the grill 23 with the air through the passage 24 of the grill 23, and flows through the air discharging passage 22 to the vacuum-generating device that has a filter (not shown) at an upper part therein. The filth is separated from the air and filtered in the filter, and the cleaned air is discharged to the outside of the vacuum cleaner through the vacuum-generating device. Meanwhile, dust collecting function of the vacuum cleaner is decreased because the filth clogs the passage holes of the filter. Thus, improvements in these type devices is needed.

SUMMARY OF THE INVENTION

The present invention has been made to overcome the above-mentioned problems of the related art. Accordingly, the present invention provides a grill assembly of a cyclone dust collecting apparatus for a vacuum cleaner that is capable of improving dust collecting function of the vacuum cleaner by reducing the amount of the filth that is drawn to a vacuum-generating device through the grill.

This is accomplished by providing a grill assembly of a cyclone dust collecting apparatus of a vacuum cleaner. The grill assembly of the cyclone dust collecting apparatus for the vacuum cleaner according to the present invention is disposed at an upper part of an air discharging passage of a cyclone body that generates whirling air current from the air drawn thereinto and separates filth from the drawn air by a centrifugal force of the whirling air current, thus preventing the filth from being drawn into a vacuum-generating device of the vacuum cleaner. The grill comprises a grill body, and a plurality of blades formed at a predetermined space for forming a passage along an outer circumference of the grill body. The passage advantageously forms an acute angle with a stream line of the whirling air current, and the blades include a protrusion portion protruding from the outer circumference of the grill body to the outer part.

It is preferable that a separate shielding member, removably connected with the grill body, shields an end portion of an upper part of the grill body and also has a function of shifting the advancing direction of the filth included in the air, which flows to the grill body, to the whirling air current.

In addition, it is advisable that the height of the protrusion portion, the space between the blades, and the angle between the blades and the stream-line of the whirling air current all be determined within the range that the shade of the blades are not overlapped with each other when the blades are reflected to the imaginary cylinder coaxial with the blades.

DETAILED DESCRIPTION OF THE PREFERRED EMBODIMENT

The preferred embodiment of the present invention will be described referring to the accompanying drawings.

Figure 1:
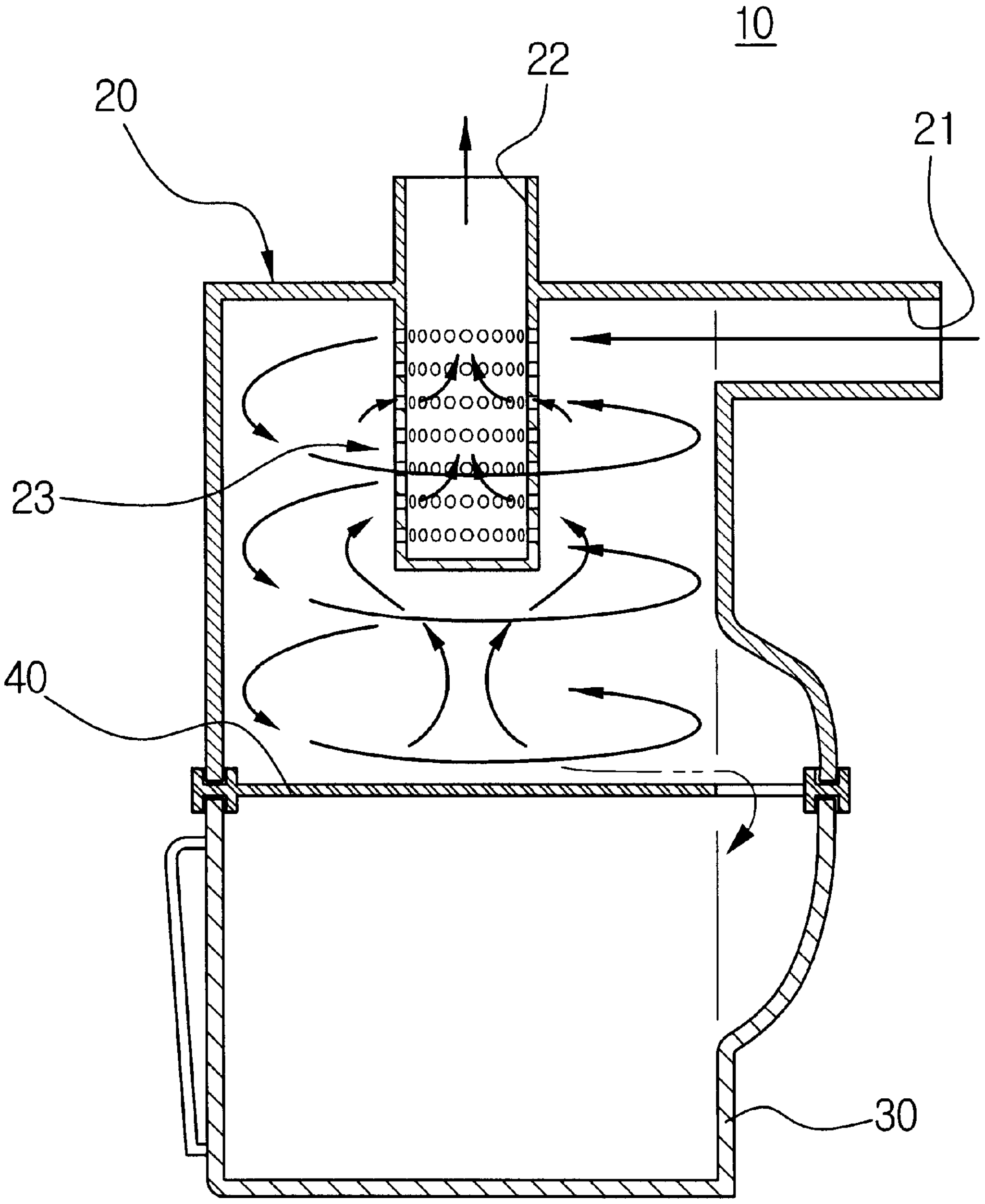
FIG. 1 is a sectional view showing a conventional cyclone dust collecting apparatus of a vacuum cleaner.
Figure 2:
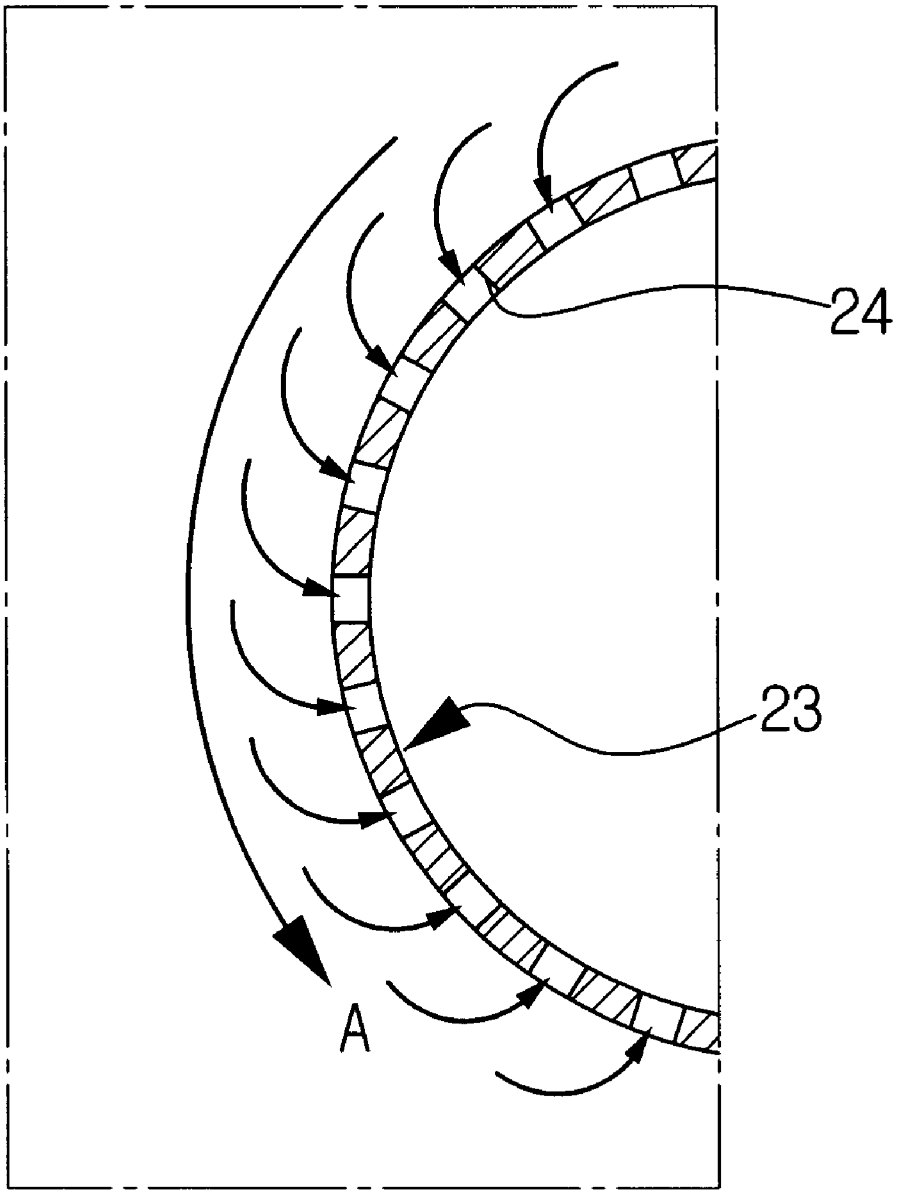
FIG. 2 is a partial sectional view illustrating the flow of the air around the grill of the conventional cyclone dust collecting apparatus of the vacuum cleaner.
Figure 3:
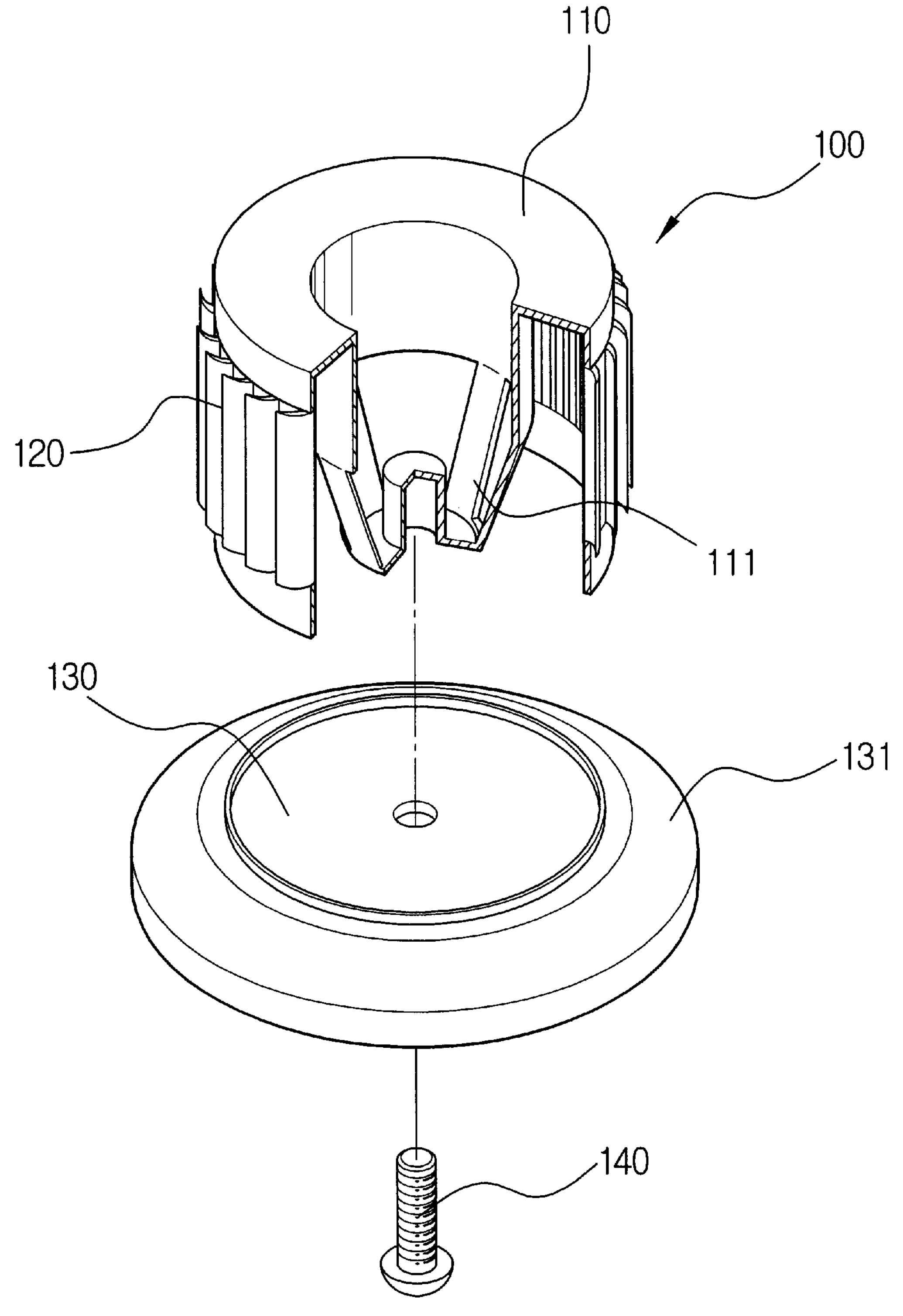
FIG. 3 is an exploded perspective view showing a grill assembly of a cyclone dust collecting apparatus for a vacuum cleaner according to the present invention.

FIG. 3 shows one example of a grill assembly of a cyclone dust collecting apparatus for a vacuum cleaner according to the present invention. The grill assembly 100 of the cyclone dust collecting apparatus for the vacuum cleaner includes a grill body 110, a plurality of blades 120, and a shielding member 130.

Figure 4:
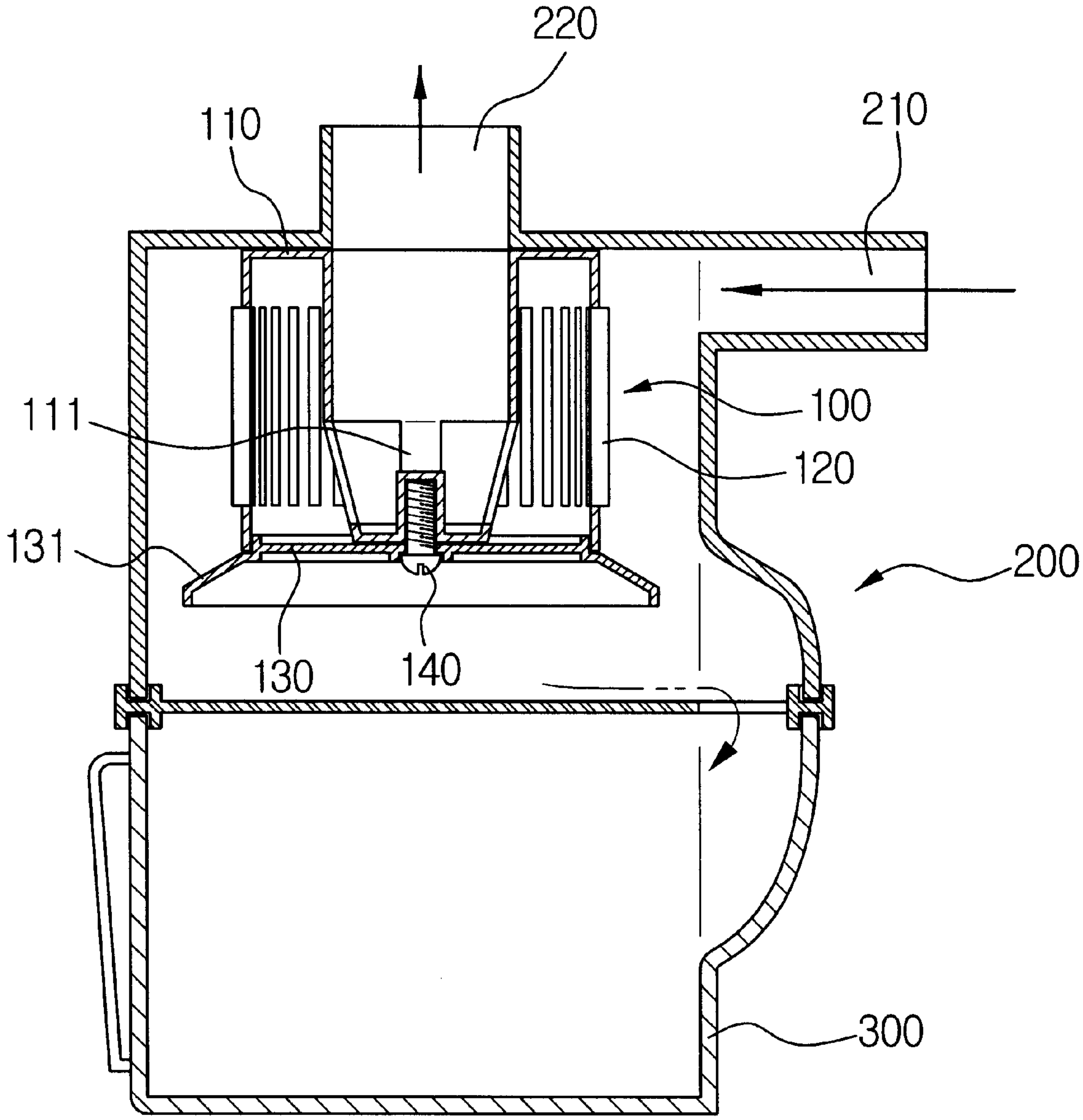
FIG. 4 is a sectional view showing the grill assembly of the cyclone dust collecting apparatus of the vacuum cleaner constructed at the cyclone body according to the present invention.

As shown in FIG. 4, the cylinder type grill body 110 has openings at both upper and lower ends. The upper opening is connected with an air discharging passage 220 of a cyclone body 200, and the lower opening is shielded by the shielding member 130.

The shielding member 130 is connected with a bracket 111, integrally formed with the grill body 110, by a screw 140. In other words, the shielding member 130 can be separated from the grill body 110 by unscrewing the screw 140, and thus the maintenance and repair of the grill assembly 100 becomes easier.

A filth backflow preventing portion 131 is disposed at the outer side of the circumference of the shielding member 130. The filth backflow preventing portion 131 shifts the advancing direction of the filth included in the air flowing to the grill body 110 to a whirling air current in the cyclone body 200. The filth backflow preventing portion 131 is composed of a plate downwardly extended from the end of the grill body 110 to the outer part in a radial direction, and the advancing direction of the filth is shifted as the filth is hit against, and reflected from the plate.

Figure 5:
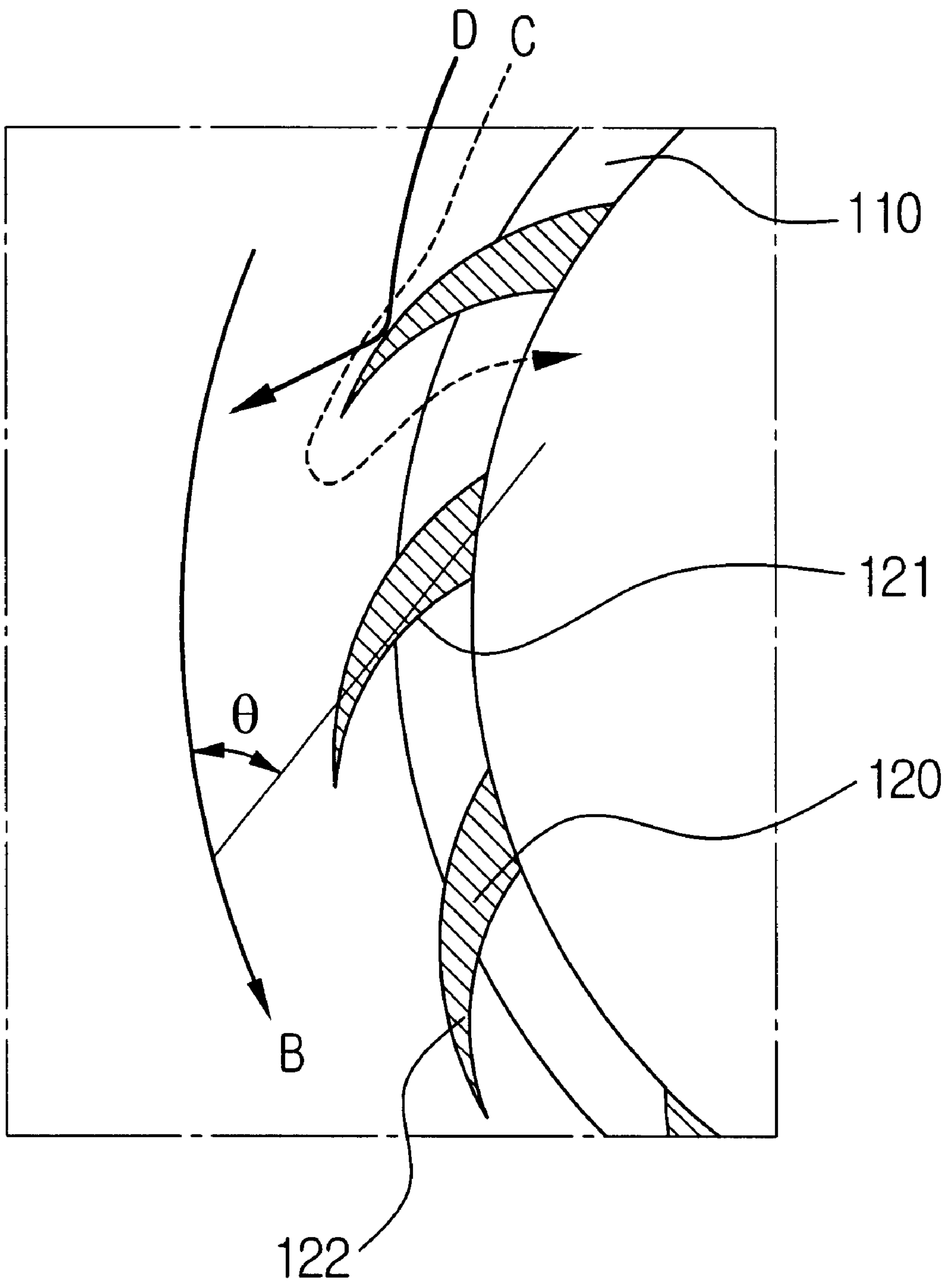
FIG. 5 is a partial sectional view explaining the flow of the air around the grill assembly of the cyclone dust collecting apparatus of the vacuum cleaner according to the present invention.

A plurality of blades 120 are disposed along the outer circumference of the grill body 110 at a predetermined spaced distance from each other so as to permit the air to pass therethrough. As shown in FIG. 5, passages 121 are formed between the blades 120. Each blade 120 also includes a protruding portion 122 protruded from the outer circumference of the grill body 110 to the outer part. The protruding portion 122 shifts the advancing direction of the filth included in the air current 'C' around the grill body 110 to the whirling air current. Thus, the advancing direction of the filth drawn into the grill assembly 100 through passage 121 by the pressure difference of the inside and outside areas of the grill assembly 100 is shifted by hitting against the protruding portion 122 (refer to 'D' in FIG. 5).

It is important that the center-line of the blades 120 and a stream-line B of the whirling air current be disposed at an acute angle θ. Thus, an angle between the passage 121 and the stream-line 'B' of the whirling air current becomes an acute angle. In other words, for the filth whirled in the air to flow into the passages 121 between the blades 120, there should be a directional shift to more than 90°. That is, it is very difficult that the filth gets through the passage 121 since it should flow back in a reverse direction to the whirling direction of the whirling air current. This effect becomes greater when the angle θ is smaller, the height of the protruding portion is higher, and the space between the blades 120 is narrower (in other words, the width of the passage is narrower), but in accordance with the fact, the flow resistance of the air passing through the passage 121 also increases. Therefore, noise becomes aggravated and the efficiency of the vacuum cleaner decreases due to a lowered suction power. Accordingly, the angle θ and the space between the blades 120 should be set considering the above fact. It is preferable that the angle θ, the height of the protruding portion, and the space between the blades 120 be determined to be within the range that the shades of the blades are not overlapped with each other when the blades are reflected to the imaginary cylinder coaxial with the blades 120.

FIG. 4 shows the grill assembly 100, having the above construction, being mounted on the cyclone body 200. The grill assembly 100 is removably connected with the cyclone body 200 by a connection member such as a screw (not shown). When the vacuum-generating device of the vacuum cleaner is operated, the whirling air current is formed in the cyclone body 200. The various filth, included in the whirling air current, is separated from the air current by a centrifugal force, and the separated filth is collected in a filth-collecting portion 300. The filth, separated from the air current but uncollected at the stage of filth collecting by the centrifugal force, is moved to the grill assembly 100 by the uprising air current whirling along the center of the cyclone body 200. At this time, some filth included in the air current is reflected after being hit against the filth backflow preventing portion 131 of the shielding member 130, and the advancing direction is shifted again to the whirling air current. Thus, the filth is whirled again into the whirling air current.

The filth that has not been separated from the uprising air current by the filth back flow-preventing portion 131 flows to the passages 121 of the grill assembly 100. The air is drawn into the grill assembly 100 through the passage 121 because of the pressure difference between the outside and the inside of the grill assembly 100. At that time, some filth included in the air current 'C' is reflected after being hit against the protruding portion 122, and, it is whirled again into the whirling air current (refer to 'D' in FIG. 5) due to its directional shift form the advancing direction. That is, the amount of the filth passing through the passage 121 decreases.

On the other hand, as describe above, the passages 121, formed by a plurality of blades 120, are disposed at an acute angle with the stream-line 'B' of the whirling air current, and the filth has a greater inertia than the air because the filth has a greater gravity than the air. In other words, for the filth, whirled in the air current, to enter the passages 121 between the blades 120, the filth should overcome the greater gravity and also divert its whirling direction more than 90°. As the filth has difficulty to pass through the passages 121, the amount of the filth flowing to the vacuum-generating device decreases. Therefore, this structure can prevent deterioration of dust collecting function, which is caused due to a clogging of the filter disposed at the upper part of the vacuum-generating device.

As describe above, according to the grill assembly 100 of the cyclone dust collecting apparatus for the vacuum cleaner of the present invention, the amount of the filth, flowing to the vacuum generating device of the vacuum cleaner through the air discharging passage of the cyclone body 200 along the air current, decreases and thus, dust collecting function of the vacuum cleaner would be improved.

Although the preferred embodiment of the present invention has been described, it will be understood by those skilled in the art that the present invention should not be so limited. Various changes and modifications can be made within the spirit and scope of the present invention as defined by the appended claims.

What is claimed is:

1. A vacuum cleaner comprising a vacuum-generating device, a cyclone dust collecting apparatus, a grill assembly for the cyclone dust collecting apparatus, the grill assembly being disposed at an upper part of an air discharging passage of a cyclone body that generates whirling air current from the air drawn thereinto and separates filth from the drawn air by a centrifugal force of the whirling air current, the grill assembly preventing the filth from being drawn into a vacuum-generating device of the vacuum cleaner, and comprising:

a grill body; and a plurality of blades disposed along an outer circumference of the grill body and being formed so that adjacent blades are spaced and separated by a predetermined space thereby defining a passage between each two adjacent blades, the passage formed at an acute angle with respect to a stream line of the whirling air current, each blade including a protrusion member protruding from the outer circumference of the grill body in a radially outward direction.

2. The vacuum cleaner of claim 1, wherein an upper end of the grill body is shielded by a separate shielding member, the shielding member being removably connected from the grill body.

3. The vacuum cleaner of claim 2, wherein the shielding member changes the moving direction of the filth entrained in the air, so as to cause the filth to flow from the grill body to the whirling air current.

4. The vacuum cleaner of claim 1, wherein a height of the protrusion member, a space between the blades, and an angle between the blades and the streamline of the whirling air current comprise predetermined values within a range wherein the radial projections of adjacent blades do not overlap each other when the blades are projected onto an imaginary cylinder coaxial with the blades.

* * * * *